United States Patent [19]

McLaren et al.

[11] Patent Number: 4,981,394

[45] Date of Patent: * Jan. 1, 1991

[54] METHOD OF SEALING PERMEABLE UNCONSOLIDATED MATERIALS

[75] Inventors: Eugene H. McLaren, Poestenkill; George W. Putman, Schenectady; James R. Young, Cazenovia, all of N.Y.

[73] Assignee: Terran Research, Inc., Cazenovia, N.Y.

[*] Notice: The portion of the term of this patent subsequent to Sep. 26, 2006 has been disclaimed.

[21] Appl. No.: 395,659

[22] Filed: Aug. 18, 1989

Related U.S. Application Data

[63] Continuation-in-part of Ser. No. 202,416, May 6, 1988, Pat. No. 4,869,621.

[51] Int. Cl.$^5$ .............. E02B 3/12; B09B 1/00
[52] U.S. Cl. .................. 405/129; 252/633; 405/128; 405/264
[58] Field of Search ............ 405/128, 129, 263, 264, 405/266, 267; 106/109, 118, 286.6; 210/751; 252/628, 633

[56] References Cited

U.S. PATENT DOCUMENTS

| | | | |
|---|---|---|---|
| 3,793,841 | 2/1974 | Dozsa | 405/263 |
| 3,876,439 | 4/1975 | Schneider | 405/263 X |
| 4,016,073 | 4/1977 | Jordan | 405/129 X |
| 4,136,998 | 1/1979 | Bassier et al. | 405/267 |
| 4,142,912 | 3/1979 | Young | 210/751 X |
| 4,233,015 | 11/1980 | Teague et al. | 405/263 |
| 4,428,700 | 1/1984 | Lennemann | 405/128 |
| 4,543,013 | 9/1985 | Wagner et al. | 405/128 |
| 4,844,840 | 7/1989 | Feizollahi | 405/129 X |
| 4,859,621 | 9/1989 | McLaren et al. | 405/263 |

*Primary Examiner*—David H. Corbin
*Attorney, Agent, or Firm*—Charles S. McGuire

[57] ABSTRACT

Methods of forming layers of material upon or below the earth's surface and above the water table to prevent or effectively inhibit the flow of groundwaters through such laters of initially unconsolidated materials. Chemical components are added to materials such as incinerator ash or other waste materials deposited in a landfill operation to create alkaline conditions which, when contacted by water, induce precipitation of calcite in sufficient quantities to produce a cementing action which retards leachate formation. In another aspect, a site is prepared for use as a landfill with an essentially hydraulically sealed sub-base by choosing a site with alkaline soils or carbonate bedrock and adding appropriate chemical components to cause calcite to precipitate when contacted by water, which may be applied directly or by naturally occurring precipitation. In yet another aspect, low level radioactive or other potentially hazardous wastes are disposed of by placing containers of such waste in underground chambers and filling the balance of the chambers with chemical components to create an alkaline buffer zone in which calcite is precipitated to provide a cementing action and retard incursion of groundwaters through the buffer zone.

15 Claims, No Drawings

4,981,394

METHOD OF SEALING PERMEABLE UNCONSOLIDATED MATERIALS

REFERENCE TO RELATED APPLICATION

The present application is a continuation-in-part of application Ser. No. 202,416, filed June 6, 1988, of the same inventors, now U.S. Pat. No. 4,869,621.

BACKGROUND OF THE INVENTION

The above-referenced patent discloses novel methods of hydraulically sealing voids in bedrock or other natural or manmade materials. The present invention involves an extension of this methodology to sealing unconsolidated waste and other materials such as: waste incinerator ash, alkaline coal burning ash, unwanted hazardous mine tailings such as uranium ores, provided alkaline conditions can be maintained, entombing radioactive or other wastes, and the like. These and other applications are possible where the cessation or inhibition of generation of hazardous leachates from the presence or storage of these and other materials is desirable.

As mentioned in the previous patent, natural cementation of rocks and sediments in nature is a well known phenomenon. Under alkaline conditions (pH >7.5), the most common natural cements by far are calcium or calcium/magnesium carbonates (mainly as calcite $CaCO_3$). These natural carbonate cements occur by chemical precipitation or growth from the pore water or groundwater solution over time and reflect a physiochemical equilibration between mineral constituents of the sediment or bedrock and pore waters, connate waters, or ambient groundwaters.

A principal object of the previous patent was to provide methods by which to achieve artificially induced carbonate cementation at a rate sufficient for practical applications in creating hydraulically sealed strata in alkaline materials. The present invention extends these applications and further provides an alkaline buffer system for certain applications. This introduces an added control effect in terms of a capacity to continue a sealing action via cementation in the event of a future breach of seal developing, for example, by fracture upon settling of earth materials, or rupture consequent to seismicity.

While the previous invention included the potential of sealing materials other than earth strata, it is a principal object of this invention to apply the same scientific principles and similar methodology to sealing unconsolidated and other materials of man-made or natural origin, in appropriate circumstances at, above, or below the earth's surface.

More specifically, one of the principal objects is to provide a method of sealing waste incinerator ash to retard or inhibit leachate formation for the purposes of safe disposal in an alkaline landfill.

Another object is to provide a method of sealing alkaline coal electrical power (energy) plant waste ash in landfills in a manner very similar to that of the waste incinerator ash.

A further object is to provide a method of rendering radioactive wastes inert from the environment by entombing containers of the waste in a subterranian chamber surrounded by man-made or constructed alkaline buffer zone capable of producing artificially induced calcite, sealing the chamber wherein the containers are enclosed with an alkaline buffer zone to maintain alkaline conditions sufficient to induce calcite precipitation, and/or sealing the fractures in the bedrock immediately surrounding the chamber (provided a neutral or greater pH can be maintained) by induced calcite precipitation.

Still another object is to provide a method of sealing waste piles, etc. of mine tailings where alkaline conditions can be maintained over a substantial period of time. This would include, but is not limited to, the entombment of discarded, hazardous, uranium mine tailings or any other mine tailings where it is desirable to prevent the encroachment of hazardous leachate waters, derived from meteoric precipitation on the tailings, into the environment.

It is also an object of this invention to provide a compatible alkaline buffering method for certain applications to ensure long term stability of an existing or induced carbonate seal and/or provide a capacity for continued or future carbonate sealing action in the presence of leachate or groundwater, in the event of rupture or fracture after initial application.

Other objects will in part be obvious and will in part appear hereinafter.

SUMMARY OF THE INVENTION

The invention involves novel methods of artificially inducing carbonate cementation or, more specifically, precipitation of calcite, as a sealant in soils, sediments, bedrock, alkaline materials (i.e. cement, waste incinerator or coal ashes, marbles, etc.), or inert or hazardous materials where an alkaline system can be maintained thereinafter. The invention also involves a novel method of providing an alkaline buffer system to maintain sealing action as a safeguard against future leaks. The methodology is subject to certain requirements in order to assure stability, as well as to certain material-specific and site-specific conditions, as discussed in the following detailed description.

Artificially induced carbonate cementation as a means of isolating or rendering hazardous or other materials inert should meet the following requirements or restrictions for use:

(a) The carbonate precipitate must be stable, i.e. compatible with the ambient hydrochemistry of not only the material to be sealed, but the encapsulating environment of the eventual resting place of the sealed material to prevent breaching by dissolution. Realistically, the system should sustain a pH of 7.5 or greater.

(b) Added chemical components dispersed after formation of the carbonate precipitate, or during subsequent maintenance or stabilization, must not ultimately enter or reach an aquifer or other aspect of the environment in such quantity as to be unacceptable in terms of water quality.

(c) In fine-grained materials such as coal or incinerator ashes, if bulk permeabilities are low then mixing may be required for the complete dispersement of the carbonate precipitating reactants. In cases such as coarse mine tailings or other similar materials, overall high permeabilities must be temporarily suspended by the creation of impoundments or similar structures. An overall limiting bulk hydraulic conductivity of $K = 10^{-1}$ cm/sec (vertical or horizontal) should be adequate control, as a general rule.

(d) Induced precipitation sealing by the methods of this invention requires adequate time commensurate with the hydraulic conductivity and voids of the material to be sealed. Induced precipitation must also allow time for over-growth crystallization, or recrystallization of initially precipitated unstable calcium carbonate phases (such as vaterite or aragonite) in pore and fracture spaces.

If the calcite solubility product is exceeded by the ion activity product of interstitial ambient pore waters in the material(s) to be sealed, then precipitation analogous to natural cementation will be induced in this area, or zone, and a chemical sealing will occur. This effect can be produced in several ways, e.g. by increasing pH, by increasing Ca ion concentration, by increasing bicarbonate ion concentration or alkalinity, by degassing $CO_2$, or by use of unstable solid forms of calcium carbonate, as described later herein.

The rate of precipitation, however, is a function of mass ion flux ($Ca^{++}$ and $CO_3^{=}$) through the material, and thus can be controlled by direct additions of appropriate constituents into the material to be sealed. These additions may be as simple as surface applications of appropriate materials for subsequent leaching into the material to be sealed, i.e. old beds of coal ash or incinerator ash, or more controlled via well injection of solutions, or by virtue of simple physical mixing of the material to be sealed and the appropriate chemicals.

(e) Production, maintenance, and long term stabilization of induced carbonate cementation will normally require an alkaline buffer system to be present, either natural or artificial, and such a system can also be used to provide a carbonate sealing capacity for the future, as described hereinafter.

The invention is described in a number of aspects, each directed to different natural/artificial conditions which are present at a site where alkaline buffering, or buffering plus sealing is desired to take place. The site itself may be considered in terms of (1) near or at the ground surface (natural or artificial); (2) subsurface unconsolidated materials; (3) subsurface excavations in bedrock.

DETAILED DESCRIPTION

Broadly speaking, the invention involves the addition of certain chemicals and natural rock products in controlled amounts to a preselected area or zone at the ground surface, or in adjacent subsurface uunconsolidated materials, or in underground excavations in bedrock or other materials. These additions are for the purpose of producing and maintaining an alkaline environment in which calcite ($CaCO_3$) is deposited by any penetrating ground or surface waters that would potentially extract leachates if allowed to flow through unimpeded. This artificial control of the chemical environment at an application site as to pH and a capacity to precipitate calcite is referred to as chemical buffering. A long-term chemical support system to maintain an induced carbonate seal in the applications noted also provides additional carbonate sealing capability into the future. In this manner the buffering system is similar to the methodology for dry chemical surface addition of reactants to allow for subsequent (surface) water infiltration to achieve a cementing action. This alkaline environment (pH >9.0) is also desirable because the oxides, hydroxides, and carbonates of most metals are of very low solubility (in fact, essentially insoluble) under such conditions, and thus are inhibited from entering any leachate waters.

In some ground surface applications such as solid waste/ash landfills, a sealing action to inhibit the ingress of meteoric precipitation can be obtained by the methods of the parent patent, but are maintained by repeated application during landfill operation in another aspect of this invention. If bedrock or surficial materials are to be directly sealed by calcite on site, then some, or all, of the chemicals may be applied to water solution, or as a slurry, as in the parent patent. Chemicals and rock products for a surface or subsurface alkaline buffer medium will normally be applied as mixed solid particulates tilled into the surface soil or landfill materials, or otherwise packed or used as a matrix in subsurface excavations.

This invention is intended for application to ground above the water table with an ambient pH of 7.0 or greater; subsurface sites below the water table should be of low permeability ($K < 1 \times 10^{-5}$ cm/sec) for long term maintenance of buffer capacity.

The alkaline buffer assemblage and calcite precipitating/sealing reactions used in this invention have been described in the parent patent. A schematic reaction in the buffer assemblage, to express its function, is:

$$Ca(OH)_2 + Na_2CO_3(+H_2O) = CaCO_3 + 2NaOH \text{(solution)}$$

or, alternatively $$CaCl_2 + Na_2CO_3(+H_2O) = CaCO_3 + 2NaCl \text{(solution)}$$

Expressed more generally, the essential reaction, in water solution, is:

$$Ca^{2+} + CO_3^{2-} = CaCO_3 \text{(solid)},$$

with the pH ($OH^-$ concentration) being controlled by use of varying amounts (proportions) of such compounds as $Ca(OH)_2$, $CaO$, $CaCl_2$, $CO_2$ and $NH_4OH$. This buffered reaction serves to seal cracks, fractures, or porosity should water "leak" into or traverse the site where the alkaline buffer assemblage has been applied.

In a first aspect of the invention, chemical components along with limestone fines (from crushed or pulverized rock) are tilled or plowed into the surface of a solid waste landfill or into soil materials of neutral to alkaline character, especially incinerator ashes, on a regular basis as material accumulates, or otherwise applied as a cover at inactive sites, followed by a watering down with a solution of one or more of the same components and to which carbon dioxide or carbonic acid may be added. When wetted, these components react to produce additional calcium carbonate which crystallizes to cement landfill "soil" particles together and, with the added limestone fines, fills void space to reduce porosity and permeability. Repeated applications thereby produce a calcite cemented "soil" analogous to natural carbonate "hardpans" or caliches. This effect inhibits the formation of leachate via percolation through the landfill or waste site, and diverts surface water to runoff.

In a second aspect of the invention, chemical components plus limestone or dolostone fines are combined to form an alkaline buffer zone in the sub-base soils required in the construction of new solid waste landfills, where located upon neutral to alkaline soils or carbonate bedrock, or a combination thereof, or where an alkaline soil zone is desired. The landfill sub-base is a prepared and graded soil beneath the liner(s) and leachate collection system(s). The presence of an alkaline buffer zone in the sub-base soil in such cases safeguards against leachate leakage beneath the landfill in the event of liner failure or small scale base soil-bedrock rupture as commonly occurs with settling or loading-excavation stress, or incidental seismicity. Any such leachate introduction into the alkaline buffer zone produces calcite deposition and sealing as described previously herein.

In yet another aspect, the method of the invention is implemented by the addition or packing of chemical components and/or limestone/dolostone fines as a solid filler, or matrix, or host, or shield around and during the deposition of solid wastes, such as low level radioactive wastes, for burial storage in underground excavations or storage in constructed underground chambers or vaults. In such application the alkaline buffer zone completely surrounding the chamber provides two functions, viz. (1) sealing against groundwater intrusion via rupture in the containing soils, bedrocks, or constructed vault, and (2) provision of an alkaline medium in proximity to any hazardous waste to render metals to the chemically least soluble forms.

Specific examples of the foregoing aspects of the invention will now be discussed. In each case it will be remembered a desired or suitable site of alkaline character is selected and the requirements for sealing or alkaline buffering identified. Samples of soil, waste materials, bedrock, and groundwater may be analyzed by conventional techniques to aid in this determination. All of the chemicals and rock materials utilized in the aspects of this invention are inexpensive and precise control of amounts applied is unnecessary as long as the quantity is sufficient to effect the desired zone of buffering and/or sealing, and constituents are mixed on a fine scale where so required (This statement is qualified to the extent that certain proportions of chemical reactants may be specified in applications partly or wholly addressed by the parent patent.)

EXAMPLE I

To retard leachate formation in a landfill of alkaline incinerator ash and reduce consequent water treatment costs, an aqueous solution or slurry of chemical components consisting of one or more of $Na_2CO_3$, $Ca(OH)_2$, lime, $(NH_4)_2CO_3$, $NH_4HCO_3$, urea, $CaCl_2$ and $CaSO_4$, along with limestone fines (from crushed or pulverized rock) is prepared. Other related chemical species with similar properties, e.g. $NH_4OH$ and $CaO$, can also be used to produce the desired alkaline buffered solution/slurry of $Ca^{2+}$ and $CO_3^{2-}$ ions with or without suspended, solid calcium carbonate. These materials are tilled, plowed, or otherwise distributed into daily ash increments deposited in an active landfill in a 10-20% proportion, as determined by preliminary tests. At inactive waste sites a larger proportion is applied as a capping or cover layer. In some cases, these components may be augmented with the addition of a slurry or dry precipitate of unstable, solid, calcium carbonate polymorphs (aragonite or vaterite), followed by a watering down with a solution of one or more of the above-named components and to which carbon dioxide or carbonic acid may be added.

Cementing or sealing of the ash occurs by the subsequent precipitation and recrystallization of calcite between soil particles. A schematic form of some typical reactions is:

$$CaSO_4 + Na_2CO_3 (+H_2O) = CaCO_3 \downarrow + Na_2SO_4 \text{ (solution)}$$

$$H^+ 3 HCO_3^- + Ca^{2+} = CaCO_3 \downarrow + 2CO_2 \text{ (degasses)}$$

(carbonic acid + bicarbonate ion) + $2H_2O$

EXAMPLE II

A sealed buffer zone may be established in the soil sub-base during initial preparation of a landfill site in or upon carbonate bedrock, where the site contains such naturally occurring formations. The buffer zone is an artificial soil layer preferably up to 2 feet thick and is provided by depositing one or more of the previously listed chemical components upon the carbonate bedrock or other landfill excavation base in dry form, to provide for subsequent sealing of any cracks, fissures, etc. in the bedrock or overburden by artificially induced calcite precipitation from any penetrating leachate waters. The resulting calcite precipitation produces an effective seal, preventing leachate waters from the subsequently formed landfill to enter the ground water below the buffer zone. Some typical reactions are schematically represented as follows:

$$CaO + Na_2CO_3 + H_2O = CaCO_3 \downarrow + 2NaOH$$

$$NaOH + HCO_3^- + Ca^{2+} = CaCO_3 \downarrow + H_2O + Na^+ \text{ (exit}$$
(from groundwater)      groundwater + leachate)

EXAMPLE III

A safety zone (seal) is provided around cannisters of low level radioactive or other hazardous waste which are buried or deposited in underground chambers or vaults, such as abandoned mine drifts, etc. One or more of the aforementioned chemical components are placed in the soil, rock, or other formation surrounding the chamber in sufficient quantity to establish the required alkaline conditions for calcite precipitation to a degree effecting a moisture-inhibiting layer around the waste. The deposited materials should also be capable of ensuring that solid precipitates form to fill any cracks or voids which may form by seismic activity or other subsurface earth movement, which otherwise might permit groundwater intrusion. The chemical reactions are the same as those previously schematically illustrated.

What is claimed is:
1. A method of retarding leachate formation and reducing water treatment costs in and around a landfill wherein alkaline incinerator ash is deposited in known increments, said method comprising:
 (a) determining the alkalinity level of said incinerator ash;
 (b) calculating the amount of one or more preselected chemical components to be added to each said known increment of said ash in the presence of water in order to produce a precipitate of in-situ crystalized calcium carbonate in sufficient quantity to provide a substantially hydraulically sealed alkaline ash or alkaline waste strata;

(c) mixing with said known increment of said ash a quantity of said preselected chemical components equal to or greater than said calculated amount of said preselected chemical components; and (d) contacting the mixture of said ash and said chemical components with water to produce said precipitate of calcium carbonate.

2. The method of claim 1 wherein said mixture is contacted with water by applying water over the surface of said mixture in a quantity at least sufficient to produce said precipitate.

3. The method of claim 1 wherein said mixture is contacted with water by preparing an aqueous solution or slurry of said chemical components prior to mixing thereof with said ash.

4. The method of claim 1 wherein said chemical components comprise one or more of $Na_2CO_3$, $Ca(OH)_3$, lime, $(NH_4)OH$, $H_2CO_3$, $NH_4HCO_3$, urea, $CaCl_2$ and $CaSO_4$.

5. The method of claim 1 wherein said chemical components include limestone and/or dolostone fines.

6. The method of claim 1 wherein said chemical components are mixed with said ash increments by spreading sad chemical components upon the surface of said ash which has been deposited in said landfill and plowing or tilling sad components into said ash.

7. The method of claim 1 wherein said chemical components include one more unstable, solid, calcium carbonate polymorphs.

8. The method of claim 1 and further including adding at least one of carbondioxide and carbonic acid to the water with which said mixture is contacted.

9. The method of preparing a site located on alkaline soils or overburden or having a naturally occurring layer of water-permeable carbonate bedrock for use as a landfill, said method comprising:

(a) analytically determining the pH of ground waters within said alkaline soils, overburden or bedrock;

(b) contacting said soils or bedrock with an aqueous solution of chemical components which, in the presence of said groundwaters and bedrock, produces precipitated calcite in quantities which substantially fill all cracks, voids and fissures in said bedrock, rendering at least the upper stratum thereof substantially fluid impermeable; and (c) constructing an alkaline sub-base soil buffer zone on the order of 2 feet thick of dry chemical components to serve as a barrier against future leachate incursion.

10. The method of claim 9 wherein said chemical components comprise one or more of $Na_2CO_3$, $Ca(OH)_3$, lime, $(NH_4)_2CO_3$, $NH_4HCO_3$, urea, $CaCl_2$ and $CaSO_4$.

11. The method of claim 9 wherein said chemical components include limestone and/or dolostone fines.

12. The method of disposing of low level radioactive waste comprising:

(a) placing said waste in an underground chamber; and (b) completely filling substantially all of the space within said chamber surrounding said waste with a layer of material having physical and chemical characteristics such that, when said material is contacted by water, from naturally occurring or manually applied sources, calcite is precipitated in sufficient quantities to provide a cementing of said material, thereby rendering said chamber essentially fluid impervious. alkaline waste strata;

(c) mixing with said known increment of said ash a quantity of said preselected chemical components equal to or greater than said calculated amount of said preselected chemical components; and (d) contacting the mixture of sad ash and said chemical components with water to produce said precipitate of calcium carbonate.

13. The method of claim 12 wherein said chamber is a mine passageway.

14. The method of claim 12 wherein said chamber is initially completely surrounded by a layer having naturally alkaline conditions, and including the further steps of chemically determining the nature of said naturally alkaline conditions and thereafter contacting said layer with an aqueous solution which, when combined with said naturally alkaline conditions, produces said calcite precipitate.

15. The method of claim 12 wherein said waste is placed in a metal container prior to being placed in said chamber.

* * * * *